US008449316B2

(12) United States Patent
Chiba

(10) Patent No.: US 8,449,316 B2
(45) Date of Patent: May 28, 2013

(54) PRESS-CONTACTING CONNECTION STRUCTURE OF ELECTRIC WIRE

(75) Inventor: Shingo Chiba, Makinohara (JP)

(73) Assignee: Yazaki Corporation, Tokyo (JP)

(*) Notice: Subject to any disclaimer, the term of this patent is extended or adjusted under 35 U.S.C. 154(b) by 162 days.

(21) Appl. No.: 13/181,695

(22) Filed: Jul. 13, 2011

(65) Prior Publication Data

US 2012/0015531 A1  Jan. 19, 2012

(30) Foreign Application Priority Data

Jul. 16, 2010 (JP) ................................ P2010-161712

(51) Int. Cl.
*H01R 4/24* (2006.01)

(52) U.S. Cl.
USPC .......................................... 439/409; 439/76.2

(58) Field of Classification Search
USPC ................................ 439/405, 406, 76.2, 456
See application file for complete search history.

(56) References Cited

U.S. PATENT DOCUMENTS

| 6,080,006 A * | 6/2000 | Broder ........................ 439/409 |
| 6,513,961 B2 * | 2/2003 | Nagai et al. ................... 362/549 |
| 7,507,094 B2 * | 3/2009 | Kubota et al. ................ 439/76.2 |
| 7,942,689 B1 * | 5/2011 | Huss et al. .................... 439/409 |
| 2004/0248456 A1 | 12/2004 | Tashiro et al. |

FOREIGN PATENT DOCUMENTS

JP  2004-165055 A  6/2004

* cited by examiner

*Primary Examiner* — Hien Vu
(74) *Attorney, Agent, or Firm* — Sughrue Mion, PLLC

(57) ABSTRACT

A press-contacting connection structure of electric wires includes a first cover of a holder, and a second cover of the holder attached to the first holder, and a holder mounting part provided on an electric wire connection target member and configured to be attached to the second cover. The electric wires arranged in parallel with each other are held between the first cover and the second cover so that one side portions of the electric wires extend from one side of the holder and the other side portions of the electric wires extend from the other side of the holder. Ends of the one side portions of the electric wires are folded toward the other side of the holder over the first cover, and are bound by a binding band with the other side portions of the electric wires. A press-contact terminal is inserted into the holder through an opening formed in the second cover when the second cover is attached with the holder mounting part, so that the press-contact terminal is press-contacted to the electric wire accommodated in the holder.

4 Claims, 16 Drawing Sheets

PRESS-CONTACTING CONNECTION STRUCTURE OF ELECTRIC WIRE

BACKGROUND

The present invention relates to a press-contacting connection structure of an electric wire used in the case of connecting loose electric wires to a press-contact terminal provided in an electric wire connection target member by press-contacting.

A method for using a press-contact terminal is widely known as a method for connecting a coated electric wire (hereinafter simply called an electric wire) in which a core wire is covered with an insulating coating to equipment (a connection target member) such as an illuminating apparatus. In this method, the press-contact terminal is attached to a housing of the equipment and the electric wire is press-contacted to a press-contact blade of this press-contact terminal. Also, a method for constructing a press-contact connector by attaching the press-contact terminal to a connector housing and press-contacting the electric wire to the press-contact blade of this press-contact terminal is widely performed.

When a distal end of the electric wire is connected to such a press-contact terminal by press-contacting, processing of the distal end of the electric wire becomes a problem. When an extra length from a press-contact place to the distal end of the electric wire with respect to the press-contact blade is too short, the electric wire may come out of the press-contact terminal when a strong tensile force acts on the electric wire. Hence, a proper extra length is left in the distal end of the electric wire but when the extra length portion is left in a free state, the mutual core wires may be short-circuited if the core wires should protrude from the cut ends of the electric wires.

In this respect, Patent Document 1 shows a distal end processing structure of an electric wire constructed so that sufficient strength with respect to a tensile load can be obtained while preventing a leak in the cut end of the electric wire by folding back an extra length portion of a distal end of a flat electric wire extending from a cover along an outer surface of the cover and together binding the extra length portion with the extra length portion stacked on the proximal side of the flat electric wire. That is, in this distal end processing structure, a press-contact portion capable of adjusting a distance between each of the insulated conductors in a width direction is formed in the end of the flat electric wire by cutting an insulated joint of a predetermined range excluding the distal end along a longitudinal direction. Also, a press-contact connector is constructed of a connector housing to which a press-contact terminal is attached, and the cover attached to the connector housing so as to cover the press-contact portion with respect to the press-contact terminal. Then, after the press-contact portion is press-contacted to a press-contact blade of the press-contact terminal, the end of the flat electric wire is folded back along the outer surface of the cover and is stacked on the flat electric wire of the proximal side and in that state, the stacked portion is bound with a binding material from the outside so as to include a cut surface of the distal end.

[Patent Document 1] JP-A-2004-165055

SUMMARY

Incidentally, the related art described in Patent Document 1 is an example of the case of using the flat electric wire, and cannot be applied without change in the case of attempting to use loose electric wires instead of the flat electric wire. That is, since the flat electric wire has a relation in which the plural insulated conductors are joined by the insulated joint and the insulated conductors are mutually constrained, even when a tensile load acts, the load dispersively acts on each of the insulated conductors but in the loose electric wires, a tensile load individually acts on the electric wires, so that a great load tends to be applied to a press-contact place and the electric wires tend to move individually. Also, when the electric wires may move in such a loose state, the mutual core wires may be short-circuited if the core wires should protrude from the cut ends of the distal ends of the electric wires. Also, the case of the loose electric wires has a problem that work of press-contacting each of the electric wires to the press-contact terminal cannot be done easily collectively as in the flat electric wire.

It is therefore one advantageous aspect of the present invention to provide a press-contacting connection structure of an electric wire in which work of press-contacting loose electric wires to a press-contact terminal can easily be done and also even when a tensile load individually acts on the electric wires, it can resist application of the load to the press-contact terminal and further mutual core wires can be prevented from being short-circuited if the core wires should protrude from cut ends of distal ends of the electric wires.

According to one advantage of the invention, there is provided a press-contacting connection structure of electric wires, comprising:

a first cover of a holder;

a second cover of the holder, attached to the first holder; and a holder mounting part, provided on an electric wire connection target member, and configured to be attached to the second cover, wherein the electric wires arranged in parallel with each other are held between the first cover and the second cover so that one side portions of the electric wires extend from one side of the holder and the other side portions of the electric wires extend from the other side of the holder, ends of the one side portions of the electric wires are folded toward the other side of the holder over the first cover, and are bound by a binding band with the other side portions of the electric wires, and a press-contact terminal is inserted into the holder through an opening formed in the second cover when the second cover is attached with the holder mounting part, so that the press-contact terminal is press-contacted to the electric wire accommodated in the holder.

The press-contacting connection structure may further comprise: an engaging part, provided at one end portion of the holder mounting part, and configured to be connected to one end portion of the holder so as to support the holder pivotably with respect to a connected portion between the engaging part and the holder; and a lock part, provided at the other end portion of the holder mounting part, and configured to lock the holder in a state where the holder is rotated with respect to the connected portion and the press-contact terminal is press-contacted to the electric wires.

The engaging part may include bearing concave parts which are disposed at the one end portion of the holder mounting part so as to join with shafts projected on both sides portion of the holder.

The one end portion of the holder may be inserted into a lower side of engaging convex parts provided at vicinities of the bearing concave parts, so that the one end portion of the holder is pressed by the engaging convex parts to be prevented from lifting.

The electric wire connection target member may be a body of a vehicle interior illuminating apparatus configured to be attached to a roof of a vehicle.

A housing constructing the body may include the holder mounting part.

The press-contact terminal may be integrally formed with a part of a busbar for an electric circuit mounted in the housing.

BRIEF DESCRIPTION OF DRAWINGS

FIG. 2A is a perspective view showing a state before assembly and FIG. 2B is a perspective view showing a state after assembly.

FIG. 9A is the whole view and FIG. 9B is an enlarged view of IXb part of FIG. 9A.

FIG. 10A is a perspective view showing a state of opening an upper cover and a lower cover and setting loose electric wires between their covers and FIG. 10B is an outline perspective view showing a state of pinching the loose electric wires between the upper cover and the lower cover by closing the upper cover and the lower cover.

FIG. 11A is a perspective view and FIG. 11B is a top view.

FIG. 15A is the whole perspective view and FIG. 15B is a main enlarged perspective view.

FIG. 17A is the whole perspective view and FIG. 17B is a main enlarged perspective view.

DETAILED DESCRIPTION OF EXEMPLIFIED EMBODIMENTS

An embodiment of the invention will hereinafter be described with reference to the drawings.

Figure 1:
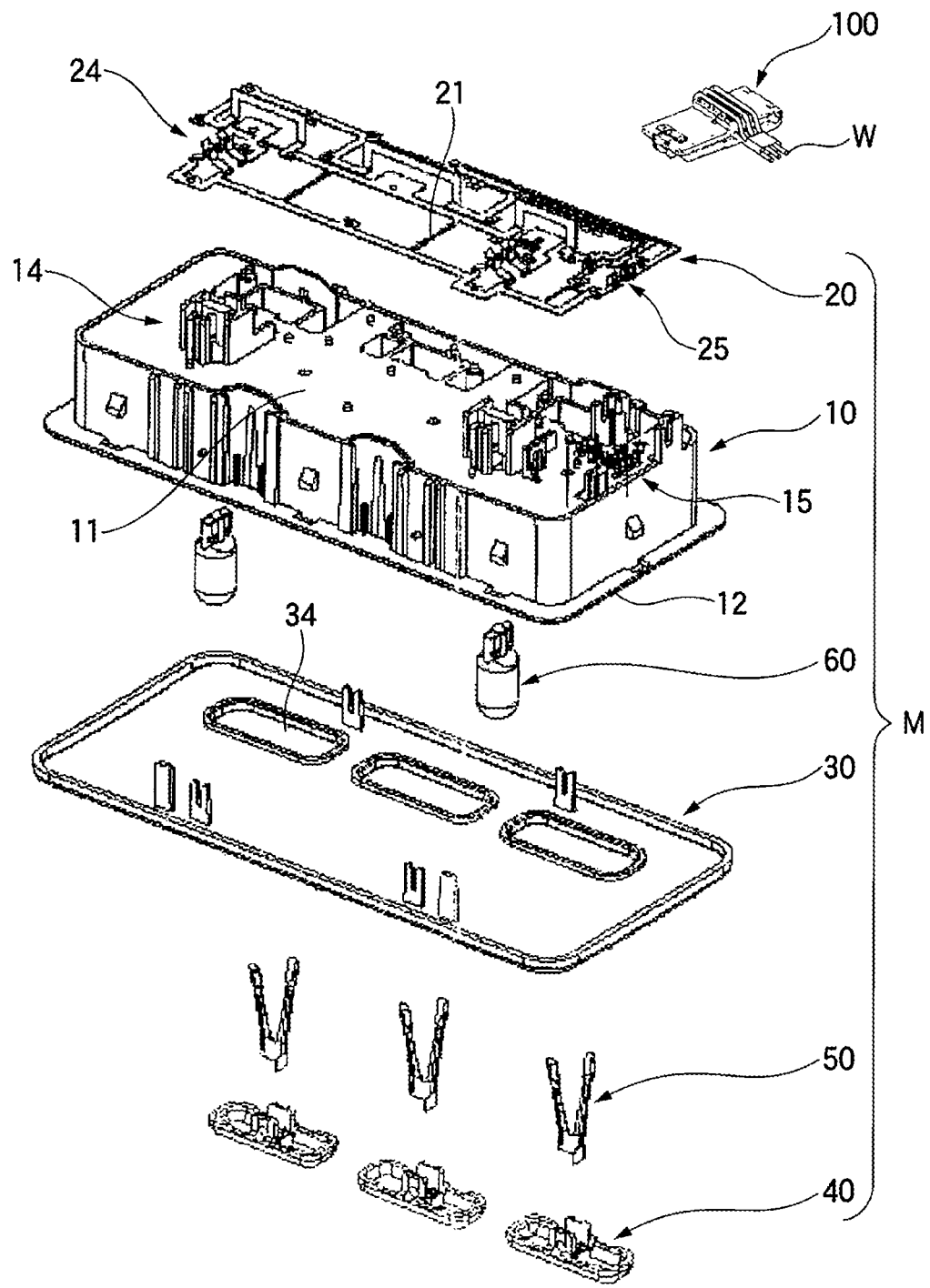
FIG. 1 is an exploded perspective view of a vehicle interior illuminating apparatus to which a press-contacting connection structure of an electric wire of an embodiment of the invention is applied.
Figure 9A:
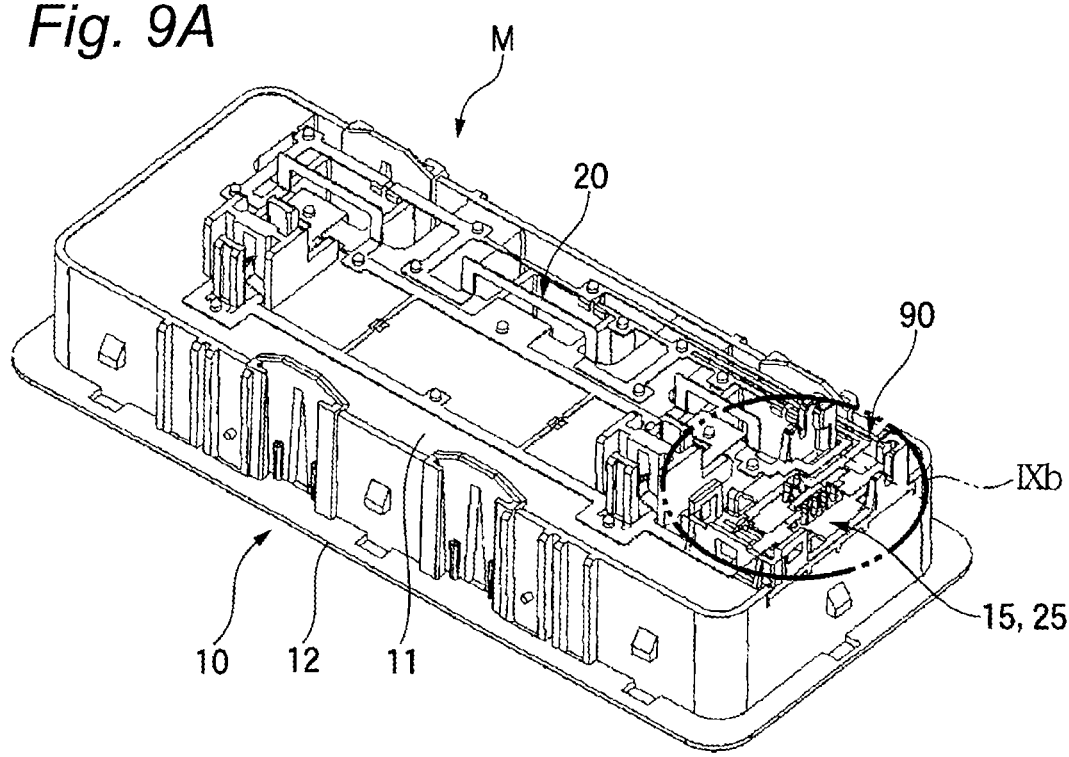
FIGS. 9A and 9B are perspective views showing a configuration of the back side of the housing of the vehicle interior illuminating apparatus.
Figure 9B:
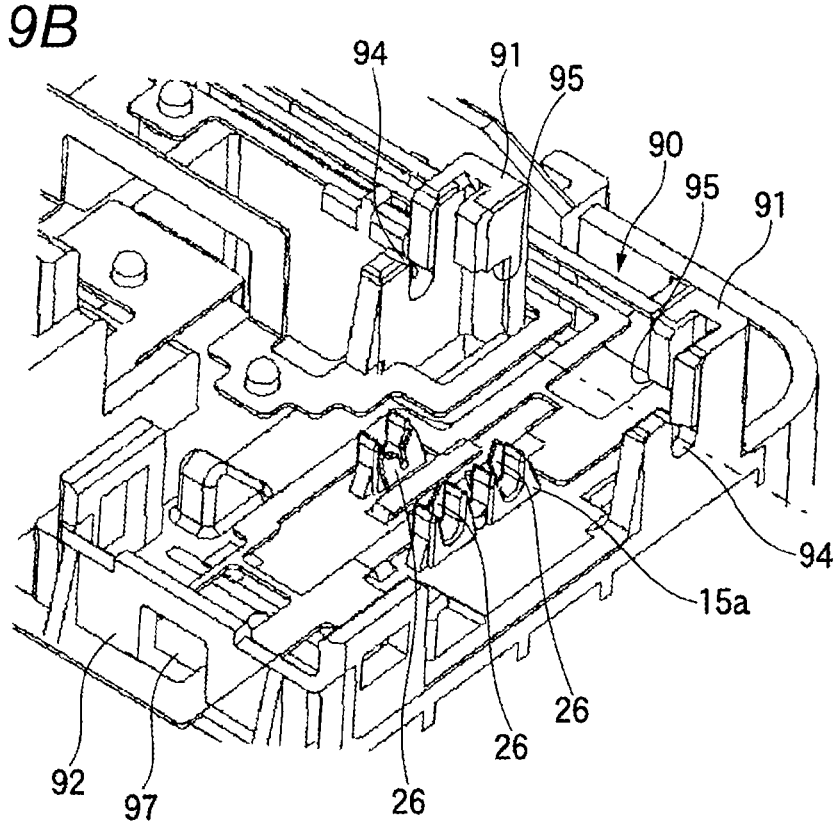

FIG. 1 is an exploded perspective view of a vehicle interior illuminating apparatus to which a press-contacting connection structure of an electric wire of the embodiment is applied, and FIGS. 2A to 7 are views showing an assembly procedure of the same vehicle interior illuminating apparatus, and FIGS. 9A and 9B are views showing a configuration of a holder mounting part of the back side of the vehicle interior illuminating apparatus to which the press-contacting connection structure of the electric wire of the embodiment is applied, and FIGS. 10A to 13 are views showing a procedure to a state of setting a holder for electric wire connection in a distal end of the electric wire, and FIGS. 14 to 17B are views showing a procedure to a state of mounting the holder in the holder mounting part of the back surface of the vehicle interior illuminating apparatus.

As shown in FIG. 1, this vehicle interior illuminating apparatus M has a housing 10 or a busbar 20 constructing a functional part (a body of the illuminating apparatus), and a cover 30 with a lens constructing a design part. Since the housing 10 and the cover 30 are attached to a vehicle roof while maintaining a vertical direction shown in FIG. 1, the vertical direction is defined according to the direction of this FIG. 1 in the present specification. The busbar 20, switch knobs 40 and bulbs 60 are mounted in the housing 10 made of resin, and contact members 50 are mounted in the switch knobs 40.

Figure 2A:
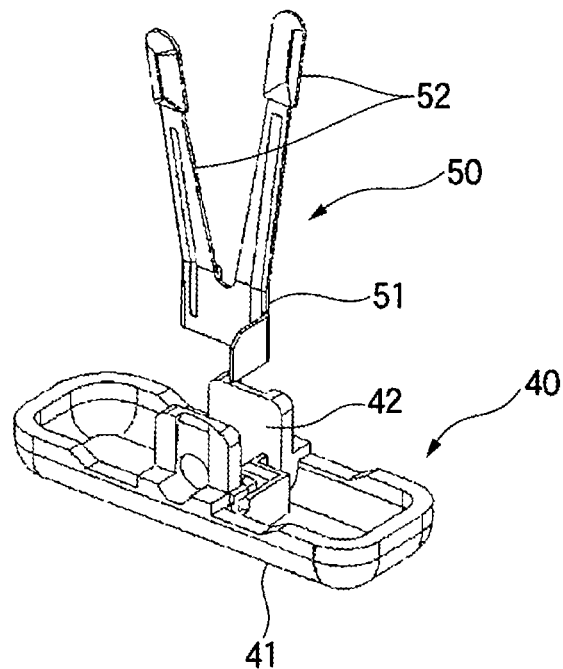
FIGS. 2A and 2B are views showing a relation between a switch knob and a contact member in the same vehicle interior illuminating apparatus.
Figure 2B:
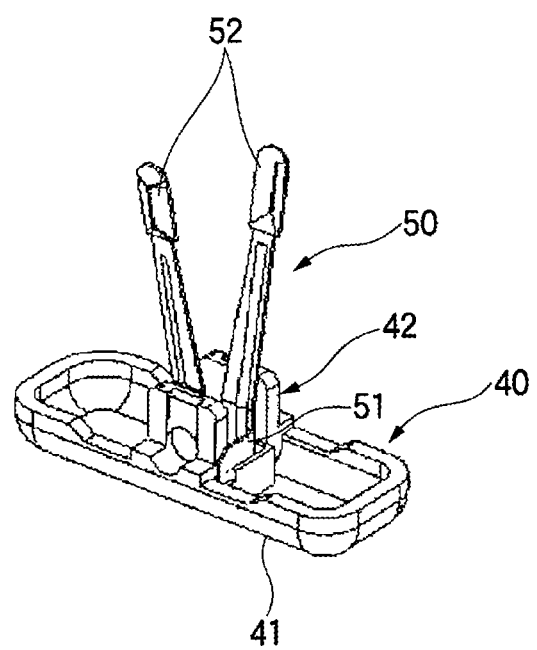

FIGS. 2A and 2B show a relation between the switch knob 40 and the contact member 50. A switch installed in the functional part has a seesaw type, and a back surface of an operation part 41 of the switch knob 40 mounted swingably is provided with a bracket 42, and a proximal part 51 of the contact member 50 is mounted in its bracket 42. The contact member 50 has two arm springs 52 with a V shape, and seesaw switches SW1 to SW3 (see FIG. 6) are constructed using these arm springs 52 as a moving contact.

Figure 3:
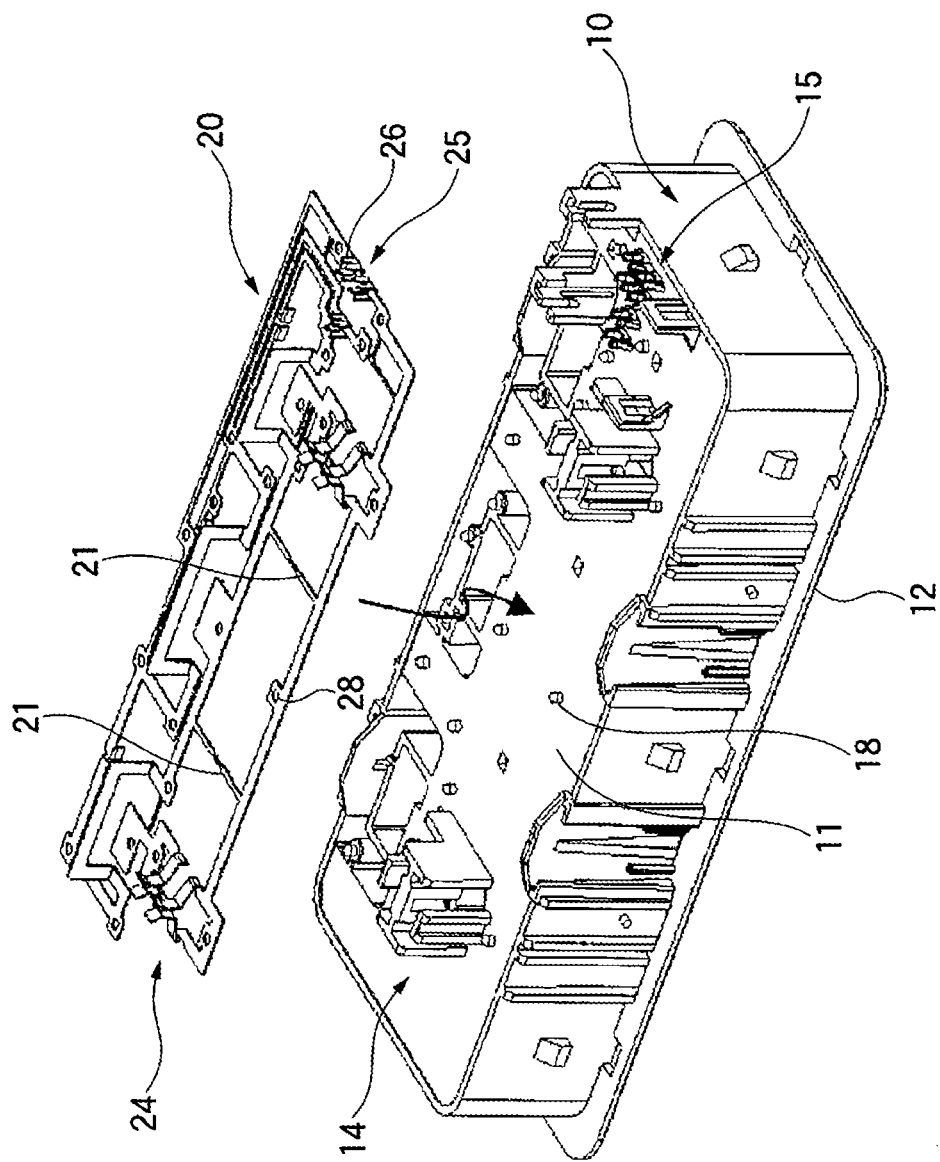
FIG. 3 is a perspective view showing a state of attempting to assemble a busbar in a back surface of a housing of the vehicle interior illuminating apparatus.
Figure 4:
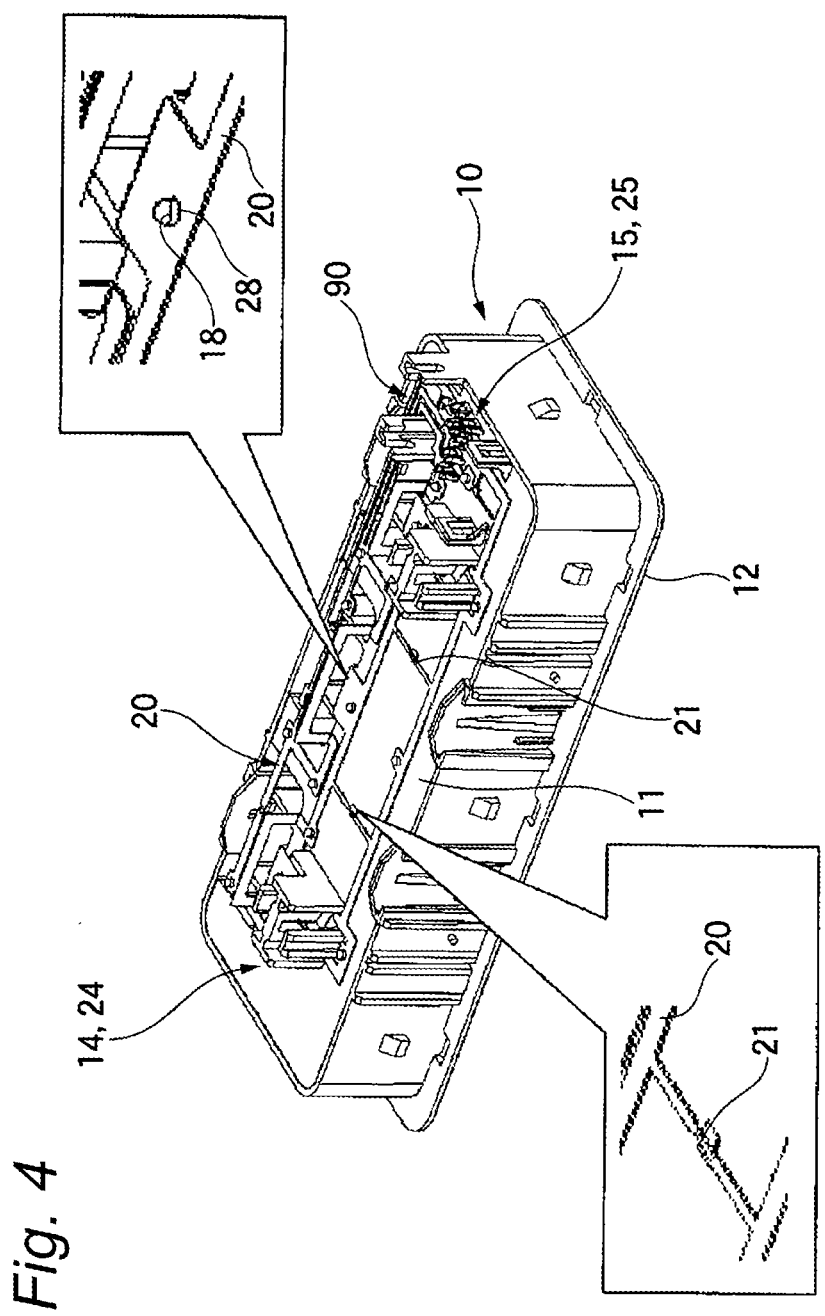
FIG. 4 is a perspective view showing a state of assembling the busbar in the back surface of the housing of the vehicle interior illuminating apparatus.

As shown in FIGS. 3 and 4, the back side of the housing 10 is provided with a busbar placement surface 11, and a fixing pin 18 for busbar fixing is projected on its busbar placement surface 11 and also, the end of the busbar placement surface 11 is provided with an electric wire connecting part 15. Also, the housing 10 is provided with a bulb mounting part 14, a flange 12 for fixing the cover 30 with the lens, etc.

The busbar 20 is divided into plural paths and is manufactured in a form in which the whole is integrally joined through line punching parts 21 before assembly. The busbar 20 is provided with a bulb mounting terminal part 24, an electric wire connecting part 25, a fixing pin hole 28, etc. The busbar 20 is fixed to the housing 10 by thermally welding the pin 18 fitted into the fixing pin hole 28 after the busbar 20 is placed on the busbar placement surface 11 of the housing 10. Also, plural independent system circuits are constructed by cutting the line punching parts 21 after the fixing.

Figure 5:
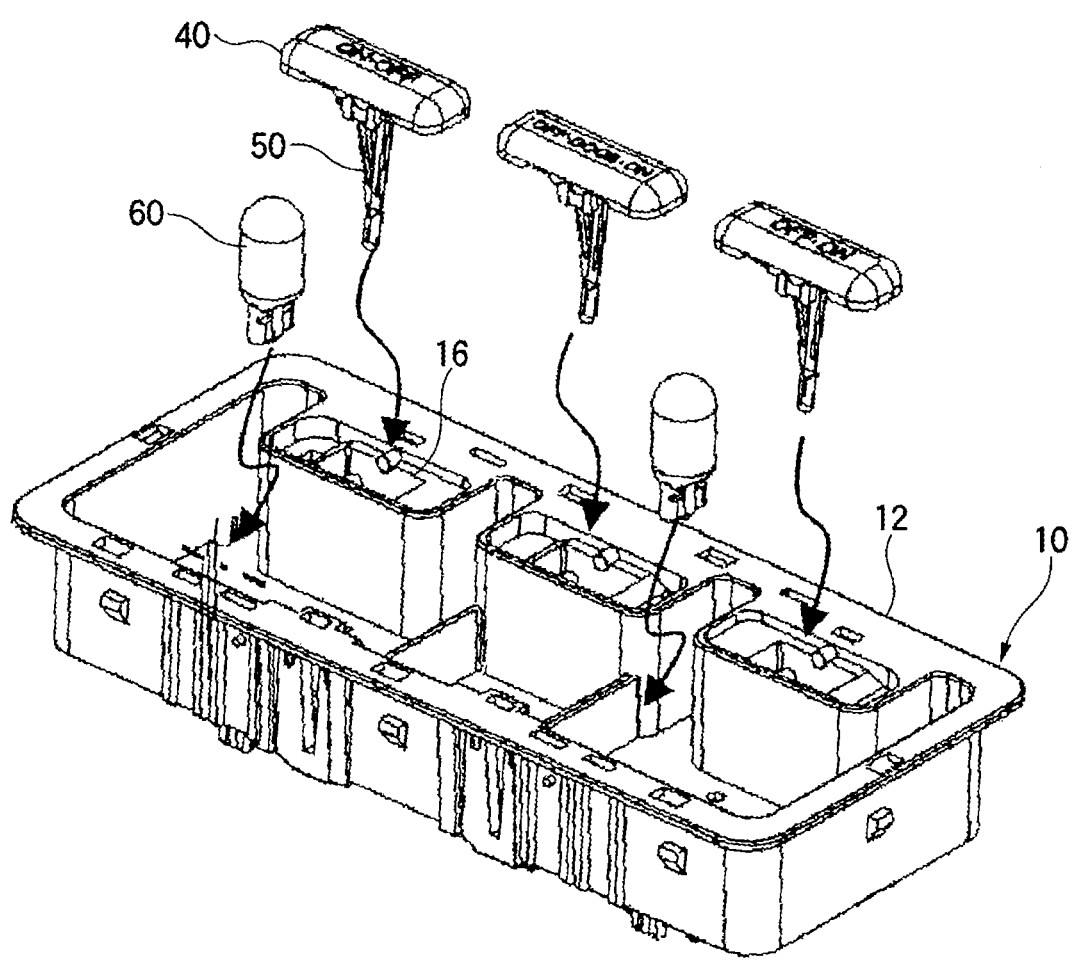
FIG. 5 is a perspective view showing a state of attempting to assemble bulbs and the switch knobs in a front surface of the housing of the vehicle interior illuminating apparatus.
Figure 6:
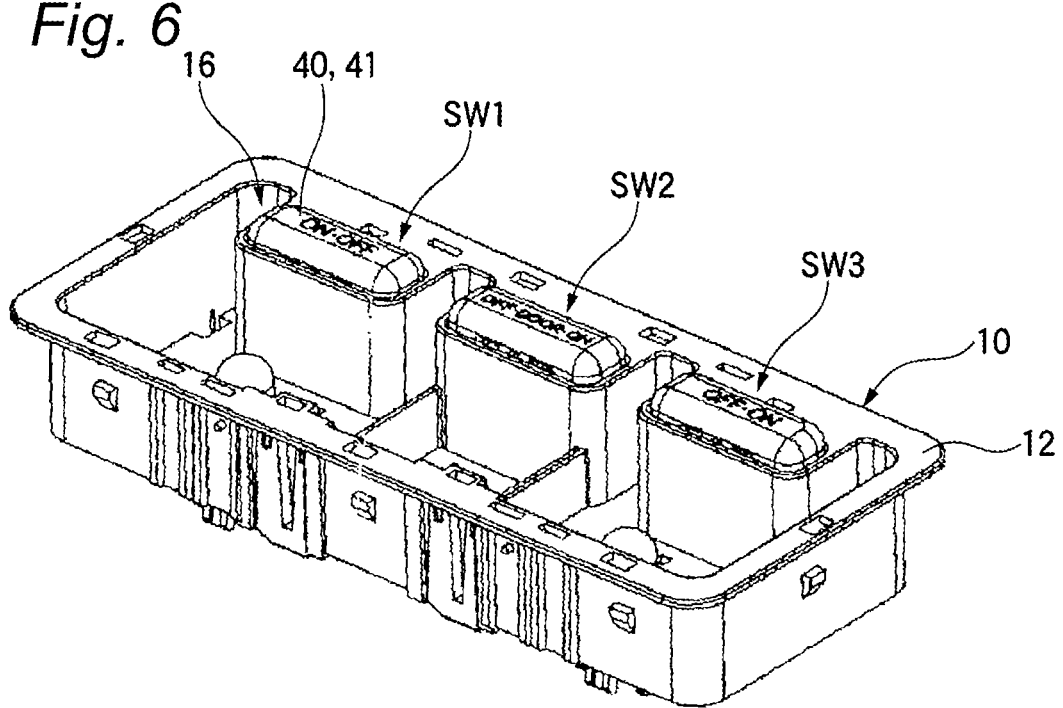
FIG. 6 is a perspective view showing a state of assembling the bulbs and the switch knobs in the front surface of the housing of the vehicle interior illuminating apparatus.
Figure 7:
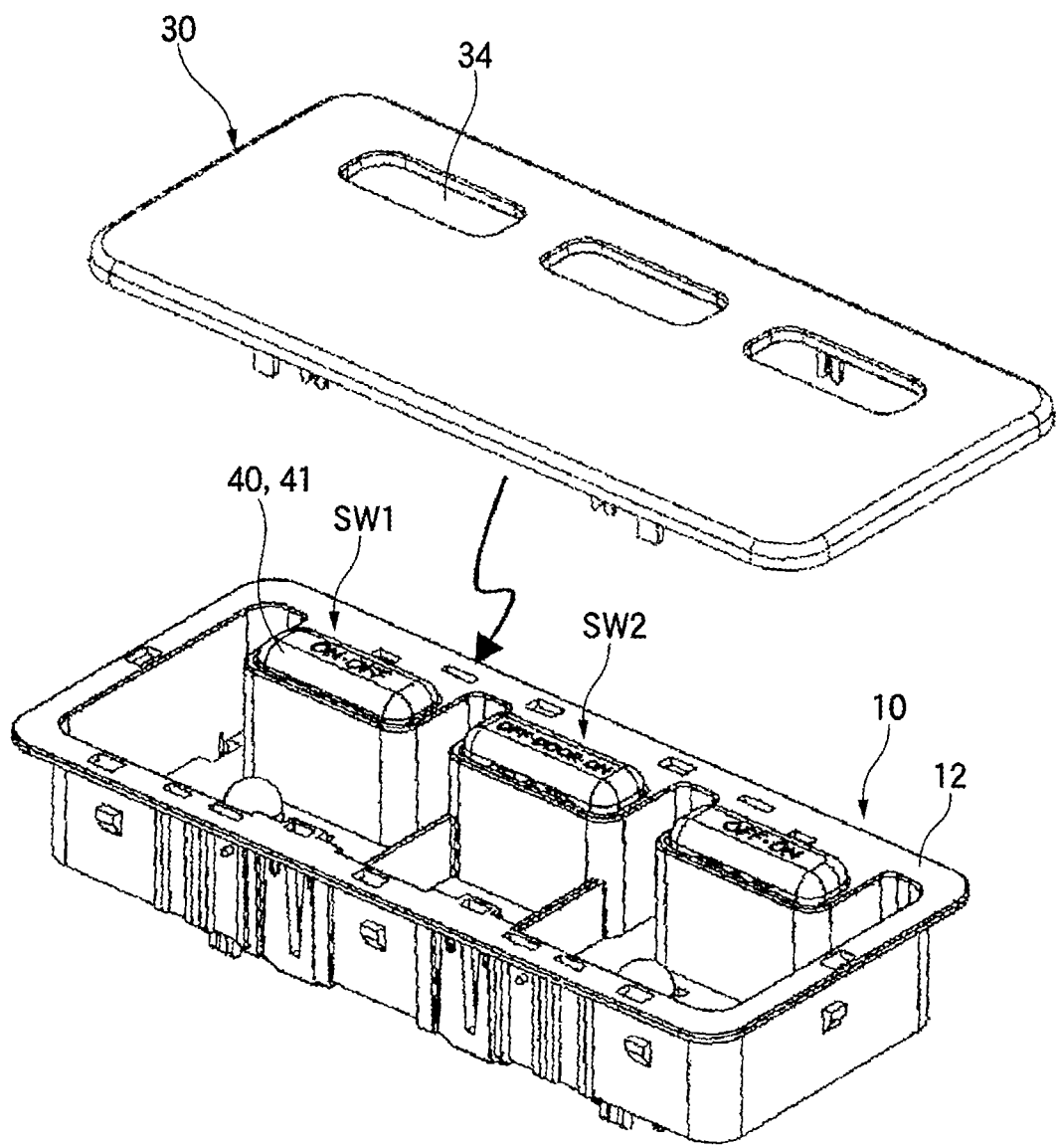
FIG. 7 is a perspective view showing a state of attempting to assemble a cover with a lens in the front surface of the housing of the vehicle interior illuminating apparatus.
Figure 8:
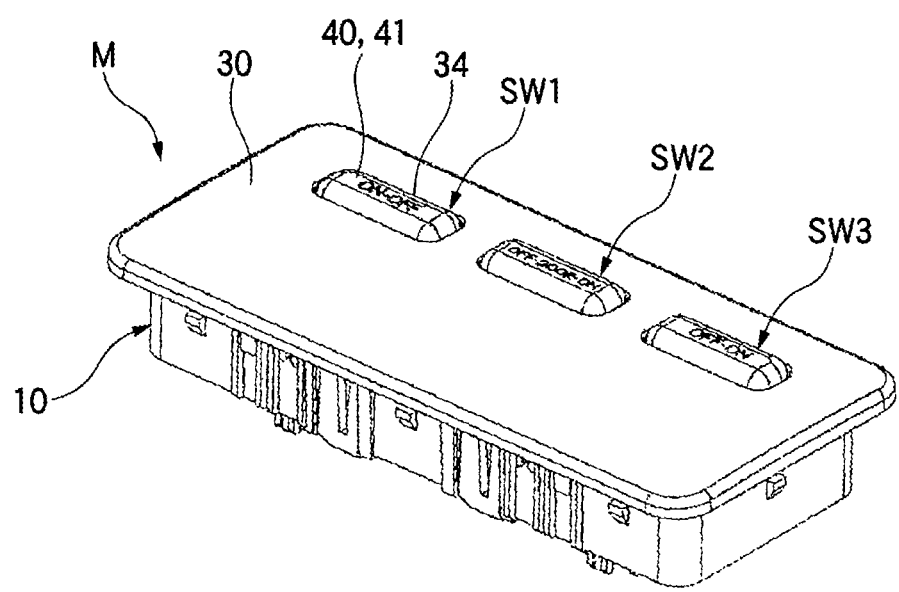
FIG. 8 is a perspective view showing a state of assembling the cover with the lens in the front surface of the housing of the vehicle interior illuminating apparatus.

When this vehicle interior illuminating apparatus M is assembled, the contact member 50 is first attached to the back surface of the switch knob 40 as shown in FIGS. 2A and 2B. Next, the busbar 20 is fixed to the housing 10 as shown in FIG. 3. Then, as shown in FIGS. 5 and 6, the switches SW1 to SW3 is constructed by assembling the switch knobs 40 in the housing 10 and also the bulbs 60 are mounted in the bulb mounting parts 14 and thereafter as shown in FIG. 7, the vehicle interior illuminating apparatus M is completed by mounting the cover 30 with the lens in the housing 10 while aligning openings 34 with the switch knobs 40.

In the back side of the vehicle interior illuminating apparatus M completed thus, the electric wire connecting part 25 of the busbar 20 is combined with the electric wire connecting part 15 of the housing 10 and in this portion, a holder mounting part 90, with substantially a rectangular shape in plan view, for mounting a holder 100 for electric wire connection described below is obtained as shown in FIGS. 9A and 9B. Plural press-contact terminals 26 projected on the electric wire connecting part 25 of the busbar 20 are arranged in this holder mounting part 90. These press-contact terminals 26 are provided every each busbar circuit, and are reinforced with ribs 15a projected on the electric wire connecting part 15 of the housing 10 as necessary.

Figure 10A:
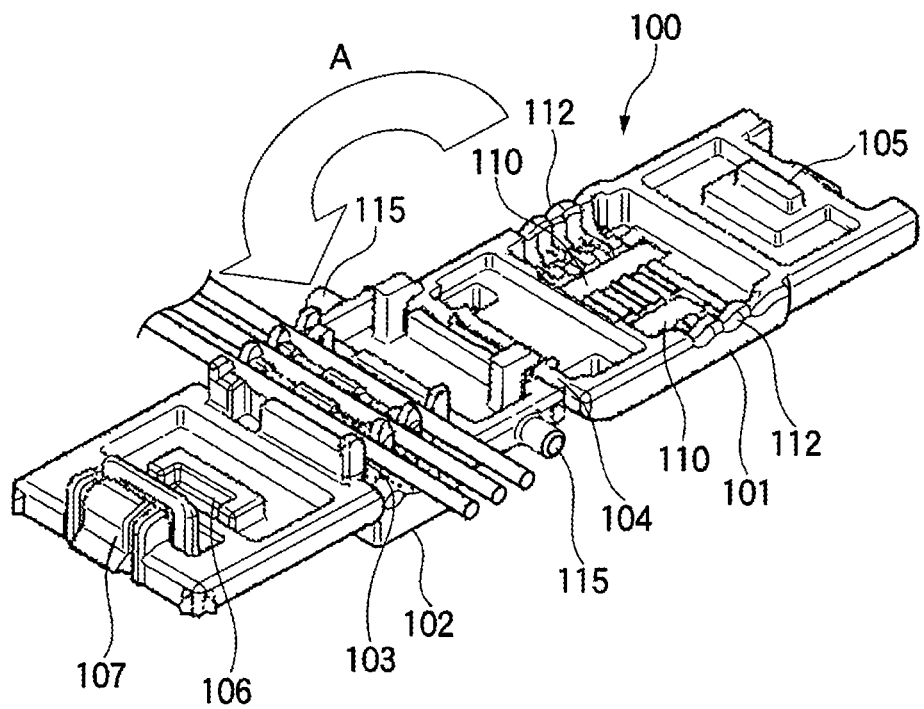
FIGS. 10A and 10B show a configuration of a holder for electric wire connection used in the case of connecting electric wires to the back side of the vehicle interior illuminating apparatus.
Figure 10B:
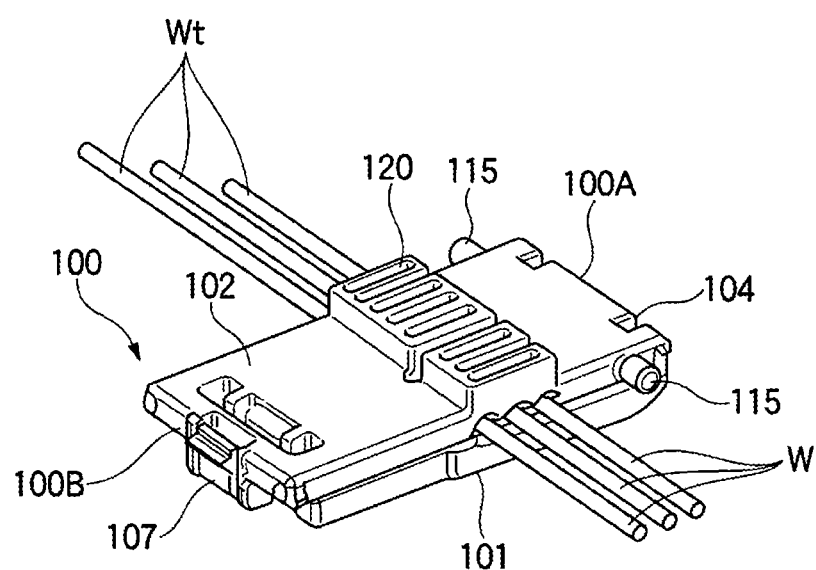

Next, a procedure for connecting loose electric wires W to this vehicle interior illuminating apparatus M will be described. When the electric wires W are connected to this vehicle interior illuminating apparatus M, the holder 100 shown in FIGS. 10A and 10B is used.

In this holder 100, one end of an upper cover 102 (a first cover) and one end of a lower cover 101 (a second cover) with a rectangular plate shape are openably and closably joined at a hinge 104, and the holder 100 has electric wire receiving grooves 103 for parallel arranging the plural electric wires W mutually at a proper distance in an inner surface of the upper cover 102. Also, a pair of shaft parts 115 protruding to the outside is had in both lateral parts of one end of the upper cover 102, and a lock part 107 for being locked in the holder mounting part 90 is had in the other end of the upper cover 102.

Also, an outer surface of the upper cover 102 is provided with a convex step part 120 corresponding to a region provided with the electric wire receiving grooves 103. This convex step part 120 is a portion for placing distal ends Wt of the electric wires when the distal ends Wt of the electric wires are folded back so as to go over the upper cover 102 as described below. Also, the lower cover 101 and the upper cover 102 are provided with closing lock parts 105, 106 for mutually locking the covers when both the covers are closed.

Also, the lower cover 101 is provided with plural window parts 110 for permitting the press-contact terminals 26 to enter the inside of the holder 100 when the holder 100 is mounted in the holder mounting part 90. These window parts 110 are arranged in positions corresponding to the electric wires W received in each of the electric wire receiving grooves 103. Further, both lateral parts of an inner surface of the lower cover 101 are provided with convex parts 112 for electric wire holding for strongly pressing the electric wires W by forcibly bending the electric wires W at inlet and outlet parts of the electric wires W to the holder 100 when the vicinities of the distal ends of the loose electric wires W are pinched between the lower cover 101 and the upper cover 102 as shown in FIG. 12.

When this holder 100 is attached to the electric wires W, the vicinities of the distal ends of the loose electric wires W are first respectively received in the electric wire receiving grooves 103 as shown in FIG. 10A. Then, the plural electric wires W are arranged mutually parallel and the proximal side of each of the electric wires W outward extends from one lateral part of the holder 100 and the distal end side of each of the electric wires W outward extends from the other lateral part of the holder 100. In this state, the lower cover 101 is rotated as shown by arrow A and the upper cover 102 and the lower cover 101 are closed and the closing lock parts 105, 106 are locked.

Then, the vicinities of the distal ends of the electric wires W are pinched between the upper cover 102 and the lower cover 101 of the holder 100, and the holder 100 is attached to the electric wires W. Then, the distal ends Wt of the electric wires outward extending from the other lateral part of the holder 100 are cut in a state of mutually varying extra lengths of the distal ends Wt as shown in FIG. 10B. In this state, the shaft parts 115 are positioned in one end 100A of the holder 100 and the lock part 107 is positioned in the other end 100B of the holder 100, and the electric wires W are in a state of extending in a direction orthogonal to a direction connecting one end 100A and the other end 100B of the holder 100.

Figure 11A:
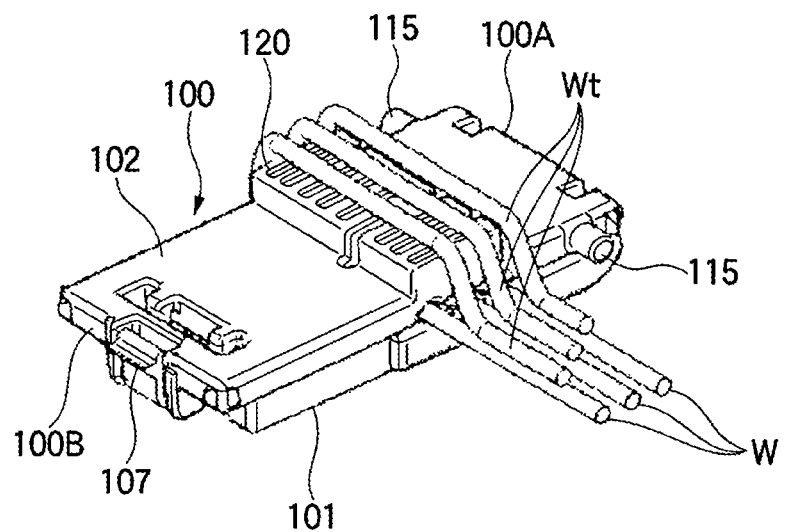
FIGS. 11A and 11B are views showing a state in which after the loose electric wires are pinched between the upper cover and the lower cover as shown in FIGS. 10A and 10B, distal ends of the electric wires extending from the holder are folded back so as to go over the upper cover and are stacked on the proximal sides of the electric wires.
Figure 11B:
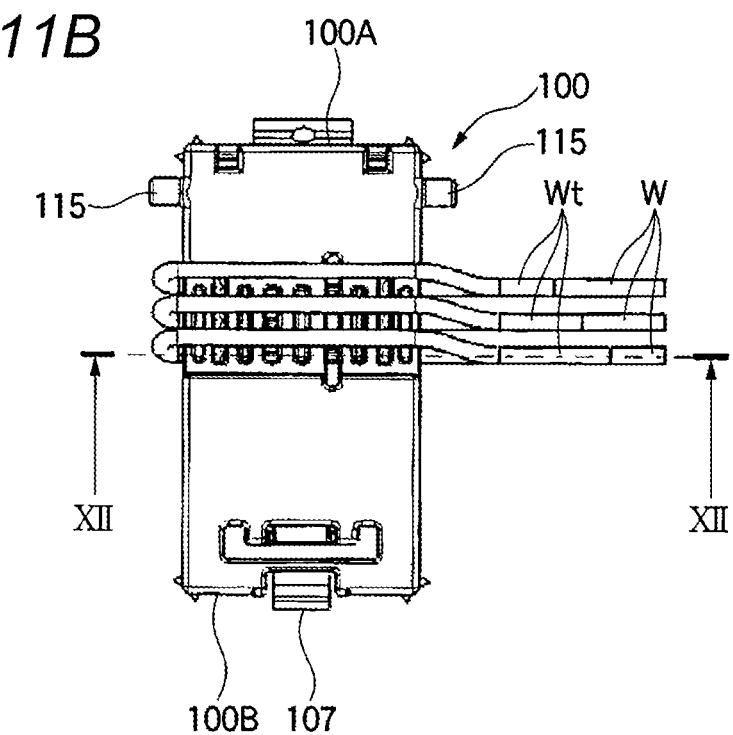
Figure 12:
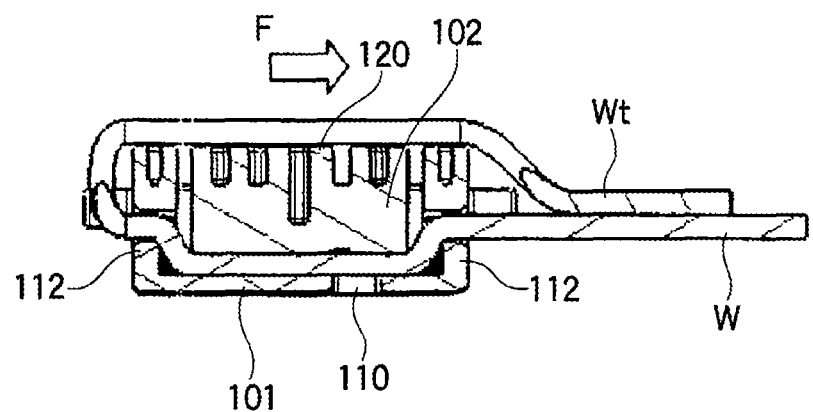
FIG. 12 is a sectional view taken on line XII-XII of FIG. 11B.
Figure 13:
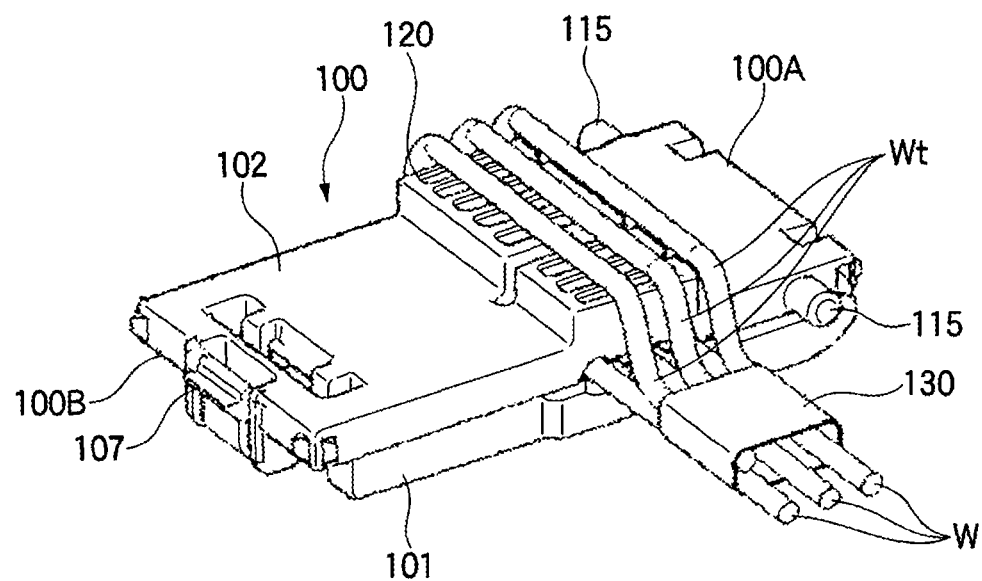
FIG. 13 is a perspective view showing a state of together binding the distal ends of the electric wires folded back as shown in FIGS. 11A and 11B to the proximal sides of the electric wires.

Then, as shown in FIGS. 11A, 11B and 12, the distal ends Wt of the electric wires outward extending from the other lateral part of the holder 100 are folded back so as to go over the convex step part 120 of the upper cover 102, and the distal ends Wt folded back are stacked on the proximal sides of the electric wires W outward extending from one lateral part of the holder 100.

By pinching the electric wires W by the upper cover 102 and the lower cover 101 of the holder 100 and folding back the distal ends Wt of the electric wires toward the proximal sides of the electric wires W in this state thus, an external force can be prevented from being applied to the electric wires W of the inside of the holder 100 even when a tensile force acts on the proximal sides of the electric wires W as shown by arrow F in FIG. 12. Then, after the distal ends Wt of the electric wires are folded back and are stacked on the proximal sides of the electric wires W as described above, the distal ends Wt of the electric wires stacked are bound together with the proximal sides of the electric wires W by a binding member (a tape, a tube, etc.) 130 and the cut ends of the distal ends Wt of the electric wires are put inside the binding member 130.

Next, a procedure to a state of mounting this holder 100 in the holder mounting part 90 of the back surface of the vehicle interior illuminating apparatus M will be described.

Before this procedure is described, a configuration of the holder mounting part 90 is described. As shown in FIGS. 9A and 9B, one end side of the holder mounting part 90 is provided with frame-shaped bracket walls 91 for defining the rectangular holder mounting part 90, and the bracket walls 91 are provided with bearing concave parts 94 for inserting the shaft parts 115 positioned in one end 100A of the holder 100 from above and engaging the shaft parts 115 and thereby rotatably supporting the holder 100 using its engaged place as a fulcrum. Also, the vicinities of the bearing concave parts 94 are provided with engaging convex parts 95 for inserting one end 100A of the holder 100 into the lower side and thereby pressing one end 100A from the upper side and inhibiting a lift of one end 100A.

Also, the other end side of the holder mounting part 90 is provided with a frame-shaped bracket wall 92 for defining the rectangular holder mounting part 90, and the bracket wall 92 is provided with a lock part 97 for being mutually locked in the lock part 107 of the side of the other end 100B of the holder 100 in a state of rotating the holder 100 and press-contacting and connecting the vicinities of the distal ends of the electric wires W to the press-contact terminals 26.

Figure 14:
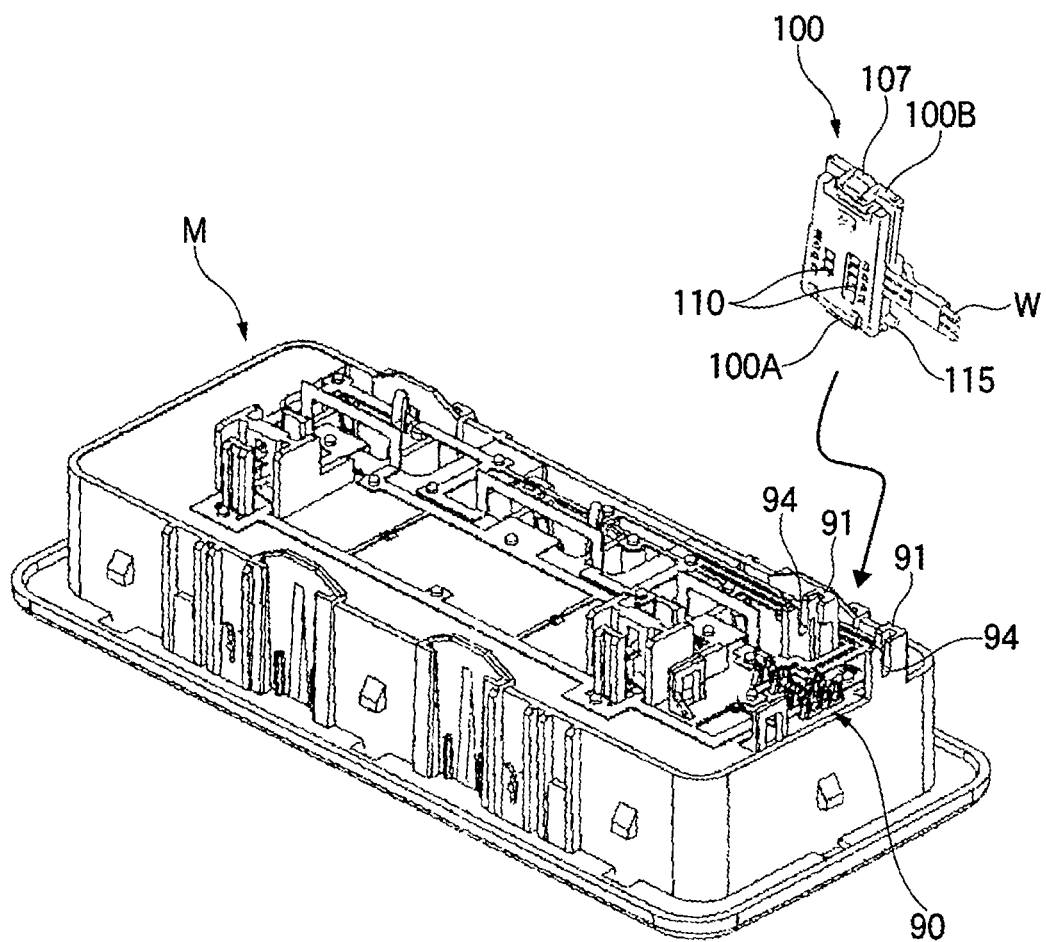
FIG. 14 is a perspective view showing a state of attempting to mount the holder attached to the distal ends of the loose electric wires as shown in FIG. 13 in a holder mounting part of the back side of the vehicle interior illuminating apparatus.

When the holder 100 attached to the distal ends of the electric wires W is mounted to the holder mounting part 90 with such a configuration, the holder 100 is first held in an attitude substantially perpendicular to an upper surface of the holder mounting part 90 with one end 100A turned to the lower side, and the shaft parts 115 arranged in both lateral parts of one end 100A of the holder 100 are inserted into the bearing concave parts 94 from above and are engaged as shown in FIGS. 14 and 15. In this case, the lower cover 101 is turned to the inside (to the center side of the holder mounting part 90) and the upper cover 102 is turned to the outside.

Figure 15A:
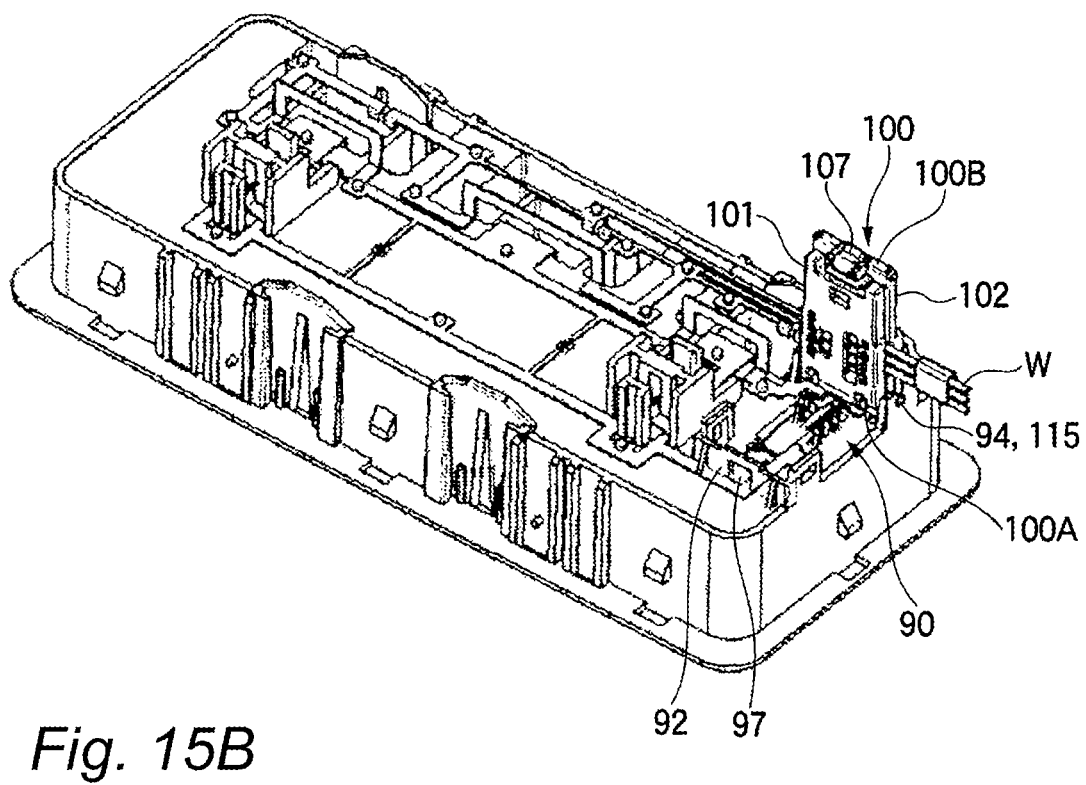
FIGS. 15A and 15B are views showing a state of fitting shaft parts of the holder into bearing concave parts with which one end side of the holder mounting part is provided.
Figure 15B:
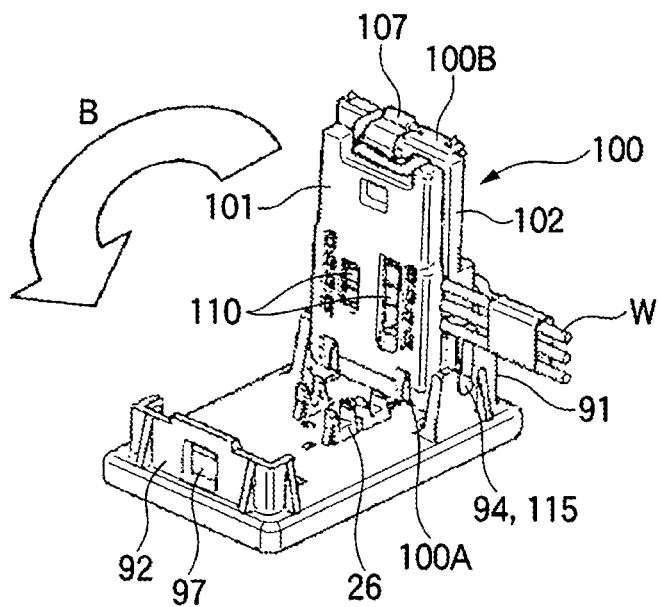
Figure 16:
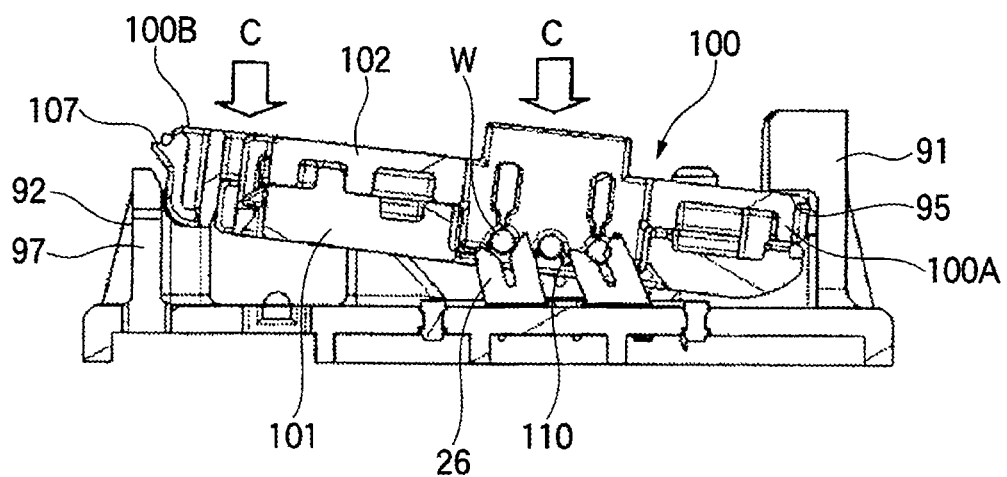
FIG. 16 is a side view showing a state of attempting to rotate the holder using an engaged place of the shaft parts and the bearing concave part as a fulcrum and press-contact the electric wires received inside the holder to press-contact terminals projected on the holder mounting part.

After the shaft parts 115 are engaged with the bearing concave parts 94, the holder 100 is rotated to the inside (in a direction facing the upper surface of the holder mounting part 90) as shown by arrow B in FIGS. 15A and 15B using its engaged place (the shaft parts 115 and the bearing concave parts 94) as a fulcrum. When the holder 100 is rotated from an upright attitude to a horizontally lying attitude, as shown in FIG. 16, the lower cover 101 changes into an attitude facing the upper surface of the holder mounting part 90 and the press-contact terminals 26 projected on the holder mounting part 90 enter the inside of the holder 100 through the window parts 110 formed in the lower cover 101.

Figure 17A:
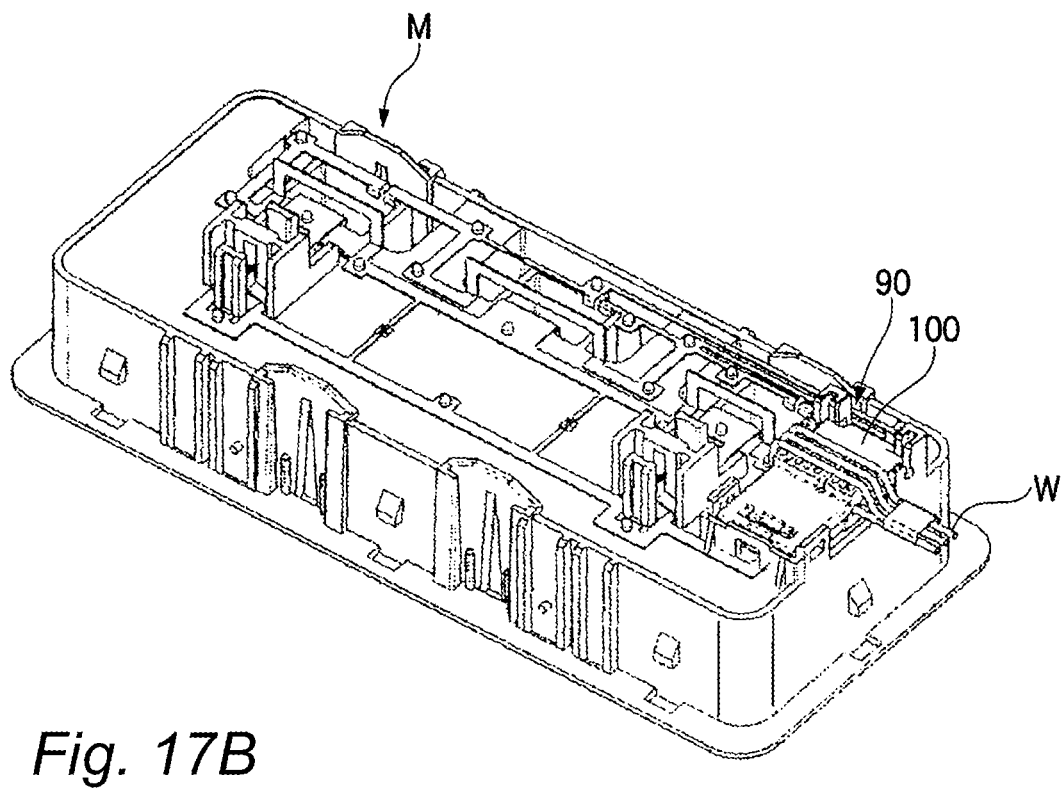
FIGS. 17A and 17B are perspective views showing a state (a holder mounting state) of press-contacting and connecting the electric wires of the inside of the holder to the press-contact terminals by rotating the holder to a position in which the lower cover faces an upper surface of the holder mounting part and abuts on the upper surface and locking the holder by a lock part.
Figure 17B:
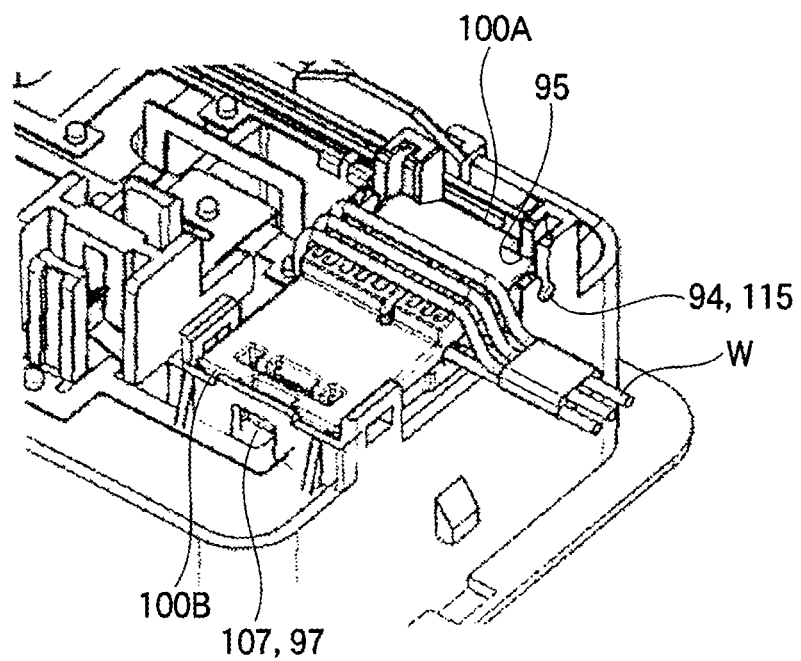

Then, the holder 100 is rotated to the last and also the holder 100 is strongly pressed downward as shown by arrow C and thereby, the electric wires W received inside the holder 100 can be press-contacted and connected to the press-contact terminals 26 entering the inside of the holder 100. At this time, one end 100A of the holder 100 is inserted into the lower sides of the engaging convex parts 95 and a lift is prevented by the engaging convex parts 95, so that the electric wires W can be press-contacted and connected to the press-contact terminals 26 by only strongly depressing the side of the other end 100B of the holder 100. Also, in this stage, as shown in FIG. 17, the lock part 107 provided in the other end 100B of the holder 100 is locked in the lock part 97 of the side of the holder mounting part 90 and thereby, mounting of the holder 100 in the holder mounting part 90 is completed and the electric wires W are connected to each of the busbars 20 through the press-contact terminals 26.

According to the embodiment as described above, the vicinities of the distal ends Wt of the plural loose electric wires W to be connected are received inside the holder 100 by collectively pinching the vicinities of the distal ends between the upper and lower covers 102, 101 and its holder 100 is mounted in the holder mounting part 90 provided on the back surface of the vehicle interior illuminating apparatus M and thereby, the plural electric wires W of the inside of the holder 100 can collectively easily be press-contacted and connected to the press-contact terminals 26 projected on the holder mounting part 90.

Further, a press-contact place of the electric wires W including the press-contact terminals 26 can be covered with the holder 100 by mounting the holder 100 in the holder mounting part 90, so that the press-contact place can be protected without another cover etc.

Also, the vicinities of the distal ends Wt of the electric wires W are pinched between the upper and lower covers 102, 101 and also the distal ends Wt of the electric wires extending to the outside of the holder 100 are bound to the proximal sides of the electric wires W in a state of being folded back so as to go over the upper cover 102 of the holder 100, so that even when a tensile load acts on the electric wires W, its force can surely be received by the holder 100 and an external force can be prevented from being applied to the press-contact terminals 26.

Also, the distal ends Wt of the loose electric wires W are bound with the distal ends stacked on the proximal sides of the electric wires W in the state of mutually varying extra lengths of the distal ends, so that a distance between cut surfaces of the adjacent electric wires W can be increased and if core wires should protrude from the ends of insulating coatings of the electric wires W, the mutual core wires can be prevented from being short-circuited.

Also, according to the embodiment, the shaft parts 115 provided on both lateral parts of one end 100A of the holder 100 are engaged with the bearing concave parts 94 provided in one end of the holder mounting part and thereby, the holder 100 can be rotated using its engaged place as the fulcrum and also a lift of one end 100A of the holder 100 is inhibited by the engaging convex parts 95, so that the holder 100 can easily be pressed on the holder mounting part 90 using "the principle of leverage" and work of press-contacting the electric wires W to the press-contact terminals 26 can be done easily and surely.

Further, the holder 100 can be positioned properly by engaging the shaft parts 115 of the holder with the bearing concave parts 94, so that the electric wires W can smoothly be press-contacted to the press-contact terminals 26. Furthermore, the holder 100 attached to the distal ends of the electric wires W is locked by the lock part 97 in a state of being properly mounted in the holder mounting part 90, so that the holder 100 can be prevented from coming out. Also, by using the press-contacting connection structure of the electric wire of the embodiment, wiring to the vehicle interior illuminating apparatus attached to the roof of the vehicle can easily be performed without using a special connector.

In addition, the invention is not limited to the embodiment described above, and modifications, improvements, etc. can be made properly. Moreover, as long as the invention can be achieved, any materials, shapes, dimensions, the number, arrangement places of each component in the embodiment described above can be used and are not limited.

For example, in the embodiment described above, the case of using the press-contacting connection structure of the electric wire according to the invention in connection of the loose electric wires to the vehicle interior illuminating apparatus has been shown, but the press-contacting connection structure can also be used in connection of the loose electric wires to other devices (a connector etc.).

Also, in the embodiment described above, the case of connecting the electric wires W to the vehicle interior illuminating apparatus M has been described, but the electric wires connected to the vehicle interior illuminating apparatus M are not limited to the loose electric wires. The electric wires connected to the vehicle interior illuminating apparatus M may be, for example, a flexible flat cable. When the flexible flat cable is connected to the vehicle interior illuminating apparatus M, it is constructed so that the ends of conductors exposed from insulators of the flexible flat cable become stepwise, that is, so that the ends in the adjacent conductors are exposed from the insulators in different longitudinal positions of the conductors. In addition, the ends are not limited to the ends in the adjacent conductors, and the ends in all the conductors may be constructed so as to be exposed from the insulators in the different longitudinal positions of the conductors. An effect similar to that of the case of connecting the loose electric wires W to the vehicle interior illuminating apparatus M can be obtained even for a structure of applying the flexible flat cable.

According to the present invention, the vicinities of the distal ends of plural loose electric wires to be connected are received inside the holder by collectively pinching the vicinities of the distal ends between the upper and lower covers and its holder is mounted in the holder mounting part provided on the electric wire connection target member and thereby, the plural electric wires of the inside of the holder can collectively easily be press-contacted and connected to the press-contact terminal projected on the holder mounting part. Further, a press-contact place of the electric wires including the press-contact terminal can be covered with the holder by mounting the holder in the holder mounting part, so that the press-contact place can be protected without another cover etc. Also, the vicinities of the distal ends of the electric wires are pinched between the upper and lower covers and also the distal ends of the electric wires extending to the outside of the holder are bound to the proximal sides of the electric wires in a state of being folded back so as to go over the upper cover of the holder, so that even when a tensile load acts on the electric wires, its force can surely be received by the holder and an external force can be prevented from being applied to the press-contact terminal. Also, the distal ends of the loose electric wires are bound with the distal ends stacked on the proximal sides of the electric wires in the state of mutually varying extra lengths of the distal ends, so that a distance between cut surfaces of the adjacent electric wires can be increased and if core wires should protrude from the ends of insulating coatings of the electric wires, the mutual core wires can be prevented from being short-circuited.

According to present invention, the holder can be rotated using the engaged place as the fulcrum by engaging one end side of the holder with the engaging part with which one end of the holder mounting part is provided, so that the holder can easily be pressed on the holder mounting part using "the principle of leverage" and work of press-contacting the electric wires to the press-contact terminal can easily be done. Also, the holder attached to the distal ends of the electric wires is locked by the lock part in a state of being mounted in the holder mounting part of the electric wire connection target member, so that the holder can be prevented from coming out.

According to the present invention, the holder can rotatably be attached to the holder mounting part using the engaged place (the shaft parts and the bearing concave parts) as the fulcrum by engaging the shaft parts projected on both lateral parts of the holder with the bearing concave parts with which one end of the holder mounting part is provided. Then, the electric wires of the inside of the holder can be press-contacted to the press-contact terminal by rotating the holder and pressing the holder on the upper surface of the holder mounting part so that the lower cover faces the upper surface of the holder mounting part. In the case of its press-contacting, a reaction force acts on the holder and thereby one end of the holder tends to lift, but the engaging convex parts press one end of the holder from the upper side, so that the holder does not lift and the electric wires can surely be press-contacted to the press-contact terminal. Also, the holder can be positioned properly by engaging the shaft parts of the holder with the bearing concave parts, so that the electric wires can smoothly be press-contacted to the press-contact terminal.

According to the present invention, wiring connection to the vehicle interior illuminating apparatus attached to the roof of the vehicle can easily be made by only connecting the loose electric wires to the press-contact terminal formed in a portion of the busbar for circuit configuration without using a special connector.

According to the invention, work of press-contacting the loose electric wires to the press-contact terminal can easily be done. Also, even when a tensile load individually acts on the electric wires, it can resist application of the load to the press-contact terminal. Further, the mutual core wires can be prevented from being short-circuited if the core wires should protrude from cut ends of the distal ends of the electric wires.

What is claimed is:

1. A press-contacting connection structure of electric wires, comprising:
   a first cover of a holder;
   a second cover of the holder, attached to the first cover; and
   a holder mounting part, provided on an electric wire connection target member, and configured to be attached to the second cover,
   wherein the electric wires arranged in parallel with each other are held between the first cover and the second cover so that one side portions of the electric wires extend from one side end of the holder and the other side portions of the electric wires extend from the other side end of the holder,
   ends of the one side portions of the electric wires are folded toward the other side of the holder over the first cover, and are bound by a binding band with the other side portions of the electric wires, and
   a press-contact terminal mounted on a surface of the holder mounting part is inserted into the holder through an opening formed in the second cover when the holder is attached with the holder mounting part, so that the press-contact terminal is inserted through the opening and press-contacted to the electric wire accommodated in the holder.

2. The press-contacting connection structure of the electric wires according to claim 1, further comprising:
   an engaging part, provided at one end portion of the holder mounting part, and configured to be connected to one end portion of the holder so as to support the holder pivotably with respect to a connected portion between the engaging part and the holder; and
   a lock part, provided at the other end portion of the holder mounting part, and configured to lock the holder in a state where the holder is rotated with respect to the connected portion and the press-contact terminal is press-contacted to the electric wires.

3. The press-contacting connection structure of the electric wires according to claim 2, wherein
   the engaging part includes bearing concave parts which are disposed at the one end portion of the holder mounting part so as to join with shafts projected on both sides portion of the holder, and
   the one end portion of the holder is inserted into a lower side of engaging convex parts provided at vicinities of the bearing concave parts, so that the one end portion of the holder is pressed by the engaging convex parts to be prevented from lifting.

4. The press-contacting connection structure of the electric wires according to claim 1, wherein
   the electric wire connection target member is a body of a vehicle interior illuminating apparatus configured to be attached to a roof of a vehicle,
   a housing constructing the body includes the holder mounting part, and the press-contact terminal is integrally formed with a part of a busbar for an electric circuit mounted in the housing.

* * * * *